United States Patent
Cristallo

(10) Patent No.: US 7,362,708 B2
(45) Date of Patent: Apr. 22, 2008

(54) METHOD AND DEVICE FOR OMP LOAD DISTRIBUTION

(75) Inventor: Geoffrey Cristallo, Sint-Pieters Woluwe (BE)

(73) Assignee: Alcatel, Paris (FR)

( * ) Notice: Subject to any disclaimer, the term of this patent is extended or adjusted under 35 U.S.C. 154(b) by 1075 days.

(21) Appl. No.: 10/265,667

(22) Filed: Oct. 8, 2002

(65) Prior Publication Data
US 2003/0072262 A1    Apr. 17, 2003

(30) Foreign Application Priority Data
Oct. 15, 2001    (EP)    ................... 01440344

(51) Int. Cl.
*G01R 31/08*    (2006.01)
*G06F 11/00*    (2006.01)
*G08C 15/00*    (2006.01)
*H04J 1/16*    (2006.01)
*H04J 3/14*    (2006.01)
*H04L 1/00*    (2006.01)
*H04L 12/26*    (2006.01)

(52) U.S. Cl. ................................. 370/235
(58) Field of Classification Search ................ 370/230, 370/229, 254, 257, 258, 256, 351
See application file for complete search history.

(56) References Cited

U.S. PATENT DOCUMENTS

| | | | |
|---|---|---|---|
| 5,467,345 A | 11/1995 | Cutler, Jr. et al. .......... | 370/200 |
| 5,748,901 A | 5/1998 | Afek et al. .................. | 709/238 |
| 5,956,339 A | 9/1999 | Harada et al. .............. | 370/400 |
| 2006/0230279 A1* | 10/2006 | Morris ....................... | 713/182 |
| 2006/0242690 A1* | 10/2006 | Wolf et al. .................... | 726/6 |

OTHER PUBLICATIONS

Curtis Villamizar: "OSPF Optimized Multipath" Internet Engineering Task Force (IETF), 'Online! Feb. 24, 1999, pp. 1-38, XP002195148.
Zheng Wang et al.: "Shortest Path First with Emergency Exits" Computer Communications Review, Association for Computing Machinery. New York, US vol. 20, No. 4, Sep. 1, 1990, pp. 166-173, XP000168052.

* cited by examiner

*Primary Examiner*—Seema S. Rao
*Assistant Examiner*—Jianye Wu
(74) *Attorney, Agent, or Firm*—Sughrue Mion, PLLC

(57) ABSTRACT

A traffic engineering module of a telecommunication device in a telecommunication network. The traffic engineering module determines traffic distribution and traffic share for each one of a set of paths between a source and a destination of the telecommunication network. The traffic distribution is adjusted on at least one of: a timer expires, receipt of load-losses information related to the critically-loaded link. The traffic engineering module includes first determining module determining for each path an equivalent load as a function of received load information and received losses information of the path, and provides thereby a set of equivalent loads; second determining module determining a maximum equivalent load out of the set of equivalent loads; and third determining module determining for each of the path an increase in traffic share proportional to a difference between the maximum equivalent load and the equivalent load of the path.

8 Claims, 1 Drawing Sheet

60: 1st DETERMINING MEANS
70: 2nd DETERMINING MEANS
80: 3rd DETERMINING MEANS
90: DISTRIBUTION MEANS

METHOD AND DEVICE FOR OMP LOAD DISTRIBUTION

BACKGROUND OF THE INVENTION

1. Field of the Invention

The technical field of the invention is routing and distributed traffic engineering.

2. Background

The invention refers to traffic engineering means of a telecommunication device in a telecommunication network, said traffic engineering means being enabled to determine a traffic distribution being a traffic share for each one of a set of paths between a source and a destination of said telecommunication network, said traffic distribution being adjusted on at least one of the following events: a timer expires, load-losses information related to the critically-loaded link has been received, and to a method to generate a traffic distribution being a traffic share for each one of a set of paths between a source and a destination of that network, that traffic distribution being adjusted on at least one of the following events: the pre-set time has expired; load-losses information related to the critically-loaded link has been received.

For routing and engineering distributed data traffic a known method is Open Shortest Path First (OSPF) Optimized Multi-Path (OMP), shortly OSPF-OMP. This is described in an Internet-Draft by Curtis Villamizar dated Feb. 18, 1999 with the title: "OSPF Optimized Multi-Path (OSPF-OMP)". OSPF routers exchange only topology information describing the topology of the network. In addition thereto, OMP routers exchange also load and losses information. They calculate several paths to each destination and split the load i.e. the information to be transported among these paths according to load and losses information.

Load adjustment may be triggered by two events: by expiration of a timer, or when load-losses information related to the critically-loaded link is received. Both criteria work in combination. The known load adjustment algorithm (as described in Appendix "B4 Adjusting Load" of the above mentioned draft of Villamizar) causes extensive computational consumption and are very complex. It is difficult to tune, and not applicable to other networks since the algorithm uses a lot of parameters adapted for the special network. The complexity of the algorithm makes it difficult to be understood by implementers and/or deployers. Especially known algorithms comprise heuristic parameters which are the result of time consuming try and error methods.

OBJECTS AND ADVANTAGES OF THE INVENTION

It is an object to provide a method and a device of the above described kind which is relatively easy to adapt to different networks, and can be worked with reduced computational work.

This object is achieved by the present invention for the engineering means in that said traffic engineering means comprises first determining means enabled to determine for each said path an equivalent load (EquivLoad$_{path\ i}$) as a function of received load information and received losses information of said path, and to provide thereby a set of equivalent loads ((EquivLoad$_{path\ 1}$), (EquivLoad$_{path\ 2}$); ... ; (EquivLoad$_{path\ n}$));

second determining means coupled to said first determining means being enabled to determine a maximum equivalent load (MaxEquivLoad) out of said set of equivalent loads ((EquivLoad$_{path\ 1}$), (EquivLoad$_{path\ 2}$); ... ; (EquivLoad$_{path\ n}$)); and third determining means enabled to determine for each said path an increase in traffic share (TsiInc) proportional to a difference between said maximum equivalent load (MaxEquivLoad) and said equivalent load (EquivLoad$_{path\ i}$) of said path i.

For the method, according to the invention the object is achieved in that the method comprises the following steps:

determining for each said path an equivalent load (EquivLoad$_{path\ i}$) as a function of received load information and received losses information of said path and to provide thereby a set of equivalent loads ((EquivLoad$_{path\ 1}$), (EquivLoad$_{path2}$); ... ; (EquivLoad$_{path\ n}$));

determining a maximum equivalent load (MaxEquivLoad) out of said set of equivalent loads ((EquivLoad$_{path\ 1}$), (EquivLoad$_{path2}$); ... ; (EquivLoad$_{path\ n}$)); and determining for each said path an increase in traffic share (TsiInc) proportional to a difference between said maximum equivalent load (MaxEquivLoad) and said equivalent load (EquivLoad$_{path\ i}$) of said path i.

Moments at which load distribution has to be adjusted are defined by one of the two criteria cited here before; at expiration of a timer, or when load-losses information relative to the critically loaded segment is received. Both criteria are used in combination.

The communication means for distributing topology is known to be by LSAs (Link State Advertisements) which are already known from OSPF. These "standard" LSAs are not used for load and losses. In addition to these "standard" LSAs, Opaque LSAs are another known type of LSAs, which may convey any type of information for specific purposes. In the specific case of OSPF-OMP, the known concept of "Opaque" LSAs is reused for the distribution of load and losses information. Opaque LSAs with load and losses information are used only by those routers which understand their information.

In the connection with the invention the following definitions are used:

Traffic Share (TS): Percentage of traffic between a certain source-destination pair sent on a path from the set of paths toward that destination;

Equivalent Load (EL): combination of load and losses information for a path.

The traffic distribution is iterative adjusted: if an adjustment decision is made, the adjustment algorithm recalculates new values of the traffic share, according to the latest load and losses information. The algorithm uses combinations of the equivalent load, timers and some heuristic parameters. It converges toward equal Equivalent Loads on each path in a set of paths.

Advantages of the invention are, that the adjustment algorithm is simply and easily tunable, can work automatically and is applicable to any network and does not require any parameter tuning operation for specific networks. The algorithm does not need any heuristic parameter.

In an embodiment of the invention, the algorithm, in the event of an adjustment decision, first identifies the maximal equivalent load MaxEquivLoad for the set of paths. In turn it looks at each path and calculates for each of them the increase Inc_TS$_{path}$ in traffic share, which increase is proportional to:

1. The difference between the equivalent load of that path EquivLoad$_{path}$ and the highest equivalent load (preferably at this time) MaxEquivLoad among the equivalent loads of all paths of the set of paths.

Further preferably the increase is also proportional to:

2. The current Traffic Share TS$_{path}$ of that path.

The higher the difference just mentioned, the higher the increase of traffic share for that path. Since OMP aims at equalizing the equivalent load of each path, a path with a smaller equivalent load EquivLoad$_{path}$ is more willing to receive additional traffic than a path with high equivalent load. If the equivalent load is equal to the maximal equivalent load MaxEquivLoad, this path is offloaded, i.e. its traffic share is decreased.

The dependency on the current traffic share TS$_{path}$ avoids too-fast changes.

The increase traffic share of a path is a percentage of the current traffic share TS$_{path}$. This percentage is in a preferred embodiment an average value between the equivalent load on that path and the maximal equivalent load, more preferably an arithmetic average, as shown in the formula $$\text{Inc\_TS}_{path} = 0.5 * \frac{MaxEquivLoad - EquivLoad_{path}}{MaxEquivLoad + EquivLoad_{path}}$$

In the formula, the result cannot exceed the value of 0.5. For normalizing it into percents, it has to by multiplied by 100. The algorithm represented by this formula does not use any heuristic parameter.

The invention causes less computational expenses: The algorithm requires only two simple computational loops, while the algorithm proposed by Villamizar requires four complex and intermixed loops.

The algorithm converges to equal equivalent load on each path. Far from the convergence point, the difference in equivalent load is important, the increase in traffic share TS is high and more traffic is shifted to that path. On the other hand, close to the convergence point, the difference in equivalent load is smaller and the increase of traffic share TS will be small.

Further features and advantages of the invention will be apparent from the following description of the preferred embodiment of the invention in connection with the drawings which show features essential for the invention, and in connection with the claims. The individual features may be realized individually or in any combination in the embodiment of the invention.

DETAILED DESCRIPTION OF THE INVENTION

Figure 1:
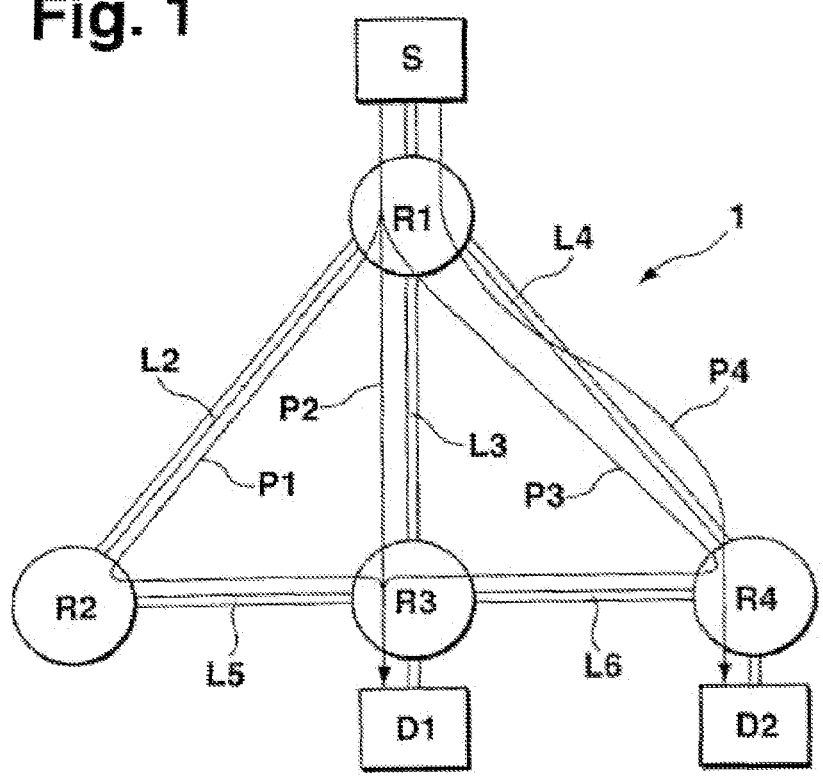
FIG. 1: is a network having four routers, one source and two destinations.

In FIG. 1 a source S is connected to router R1 which is connected with a link L2 to router R2, with a link L3 to router R3, and with a link L4 to router R4. Router R2 is connected to router R3 with a link L5, and router R4 is connected to router R3 with a link L6. A first destination D1 is connected to router R3, and a second destination D2 is connected to the router R4. The network of FIG. 1 may normally be part of a greater network.

Information has to be sent from the source S to the first destination D1 on the one hand, and from source S to the second destination on the other hand.

The routing protocol discovers the possible paths between S and D1, and between S and D2:

From source S to destination D1: There are 3 possible paths:
path P1 via links L2 and L5,
path P2 via link L3,
path P3 via links L4 and L6.

From source S to destination D2: Only one possible path P4 via link L4 exists.

The following data flows exist:

Data flow of 15 between source S and destination D2.

Data flow of 45 between S and D1 (three possible paths).

The unit for the data flows is, in this example, the number of TCP (Transport Control Protocol) connections established over the IP (Internet Protocol) network, irrespective of the band width received by each TCP connection.

In the example shown in FIG. 1, links L2, L3, L4, L5, L6 each have a capacity of 10 Mbit/s (megabits per second). The link between source S and router R1 has a capacity of 30 Mbit/s. In order to use to a maximal extent the transport capability of the network, according to the invention, the data coming from the source S into router R1 is distributed in the router R1 onto the set of possible paths P1, P2 and P3 Since there is only one possible path from S to D2, it is impossible to redistribute the traffic destined to D2

Initially traffic from S to D1 is equally split among the 3 paths P1, P2, P3 to D1: each path receives one third of the total traffic (45): one third (15) on path P1 (links L2 and L5), one third (15) on path P2 (link L3), one third on path P3 (links L4 and L6). All the traffic from S to D2 is sent on the unique path: P4 via link L4. Link 4 thus receives 15+15=30: link 4 is the critically loaded segment.

Opaque LSAs will be sent, indicating that link 4 is too much loaded. Router R1 receives these opaque LSAs and evaluates the load and loss information related to link 4 they contain. This starts change of the distribution of the data flows. Router 1 will re-adjust the distribution of traffic from S to D1: more traffic will be sent on path P1 and path P2, and less traffic will be sent on path P3, which is the critically loaded path. Since there is only one possible path from S to D2, distribution of the traffic from S to D2 is unchanged: always 15 from S to D2 on link L4.

Shifting part of the traffic to paths P1 and P2 allows to increase the amount of information transported from the source S to the destinations D1 and D2, since overall losses are reduced. This shifting or redistribution is made slightly in order to keep overshoot low. An overshoot too high would have the consequence of unwanted oscillations in the amounts of data flows, and thus a stable state might be reached not quickly enough. In a specific example of a "small" network, such redistribution needed the time of about 15 minutes.

The convergence time depends on combination of the size of the network, the complexity of the network, the topology, the number of links, the total amount of traffic. Thus, the convergence time in another network may be greater (or smaller) than the mentioned value. After that convergence time, a steady state was reached with practically equal distribution of the information coming from S to the three links L2, L3, and L4, and thus to the data paths P1, P2 and the combination of P3+P4.

Figure 2:
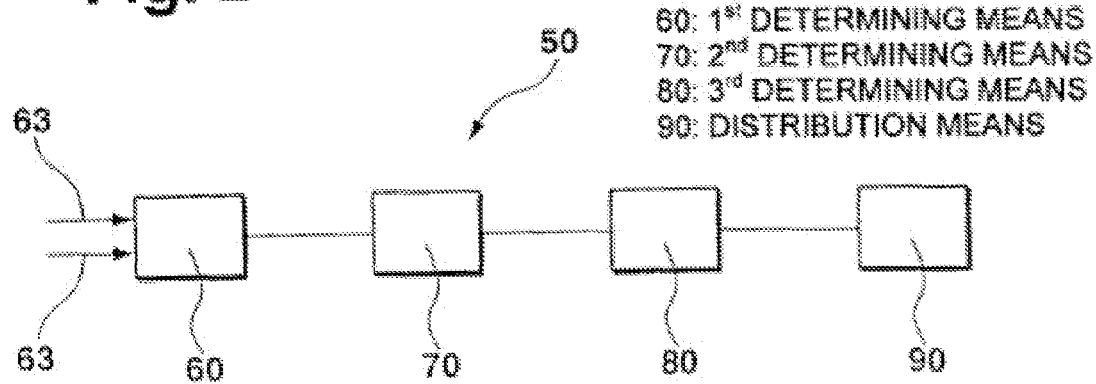
FIG. 2: is a block diagram of a traffic engineering means controlling part of the operation of the network shown in FIG. 1.

FIG. 2 shows a block diagram of a traffic engineering means, arranged in the router R1 for performing the just described best possible distribution of data flows onto the different available data paths. The engineering means 50 comprises first determining means 60, second determining means 70, and third determining means 80. The first determining means 60 determine for each link a quantity "equivalent load" related to the link transport capacity, however taking into account losses, which are unavoidable in any IP network. The equivalent load (EquivLoad$_{path\ 1}$) for each link L2, L3, L4, L5, L6 is determined as a function of received load information (known to the traffic engineering means on the basis of LSAs and opaque LSAs received by the router R1 earlier) and the engineering means produces a set of equivalent loads for the individual links.

Inputs 63 in FIG. 2 indicate terminals for information which the first determining means needs for its work.

The second determining means 70 is coupled to the first determining means 60 and determines from the equivalent loads for each individual link the highest equivalent load (MaxEquivLoad).

The third determining means 80 determines for each of the paths P1, P2, P3 an increase in traffic share (TsiInc) proportional to a difference between that highest or maximum equivalent load (MaxEquivLoad) and the actual equivalent load (EquivLoad$_{path\ e}$) of each path P1, P2, P3. In addition, this increase in traffic share is roughly spoken inversely proportional to a current traffic share of the respective path. The means 70 performs a computation using the formula for Inc_TS$_{path}$ given above.

The means 80 is connected to a distribution means 90 which performs the distribution and re-distribution on the basis of the increase in traffic share calculated by the means 70. For this, the means 80 is established to use a hash function. The hash function is a known mechanism. The traffic shares are used to adjust the images used by the hash function.

In the example, this has the result that at the start of the redistribution of data flows that link which has the highest equivalent load (link 4), namely the maximum equivalent load (MaxEquivLoad), is not urged to accept more information than it transports at the moment. Information is shifted to that paths which do not contain the critically-loaded (traffic is shifted from link L4, to paths P1 and P2 between S to D1, which do not contain the critically loaded link L4). Thus, the amount of traffic transported by link L4 is reduced, and enlarged on links L1 and L2 (amount of traffic is enlarged on path P1 and P2). Redistribution is continuously made until a practically equal distribution of the data flows (more exactly: a distribution of the amount of data flows which are as near as possible to the maximal capacity of the respective paths) has been reached.

What claimed is:

1. A traffic engineering module of a telecommunication device in a telecommunication network, said traffic engineering means being enabled to determine a traffic distribution being a traffic share (TSi) for each path (Pi) of a set of paths (P1, P2, P3) between a source and a destination of said telecommunication network, said traffic distribution being adjusted on at least one of the following events: when a timer expires or when a load-losses information related to critically-loaded link has been received, where said traffic engineering module comprising:

first determining means enabled to determine for each said path (Pi) an equivalent load (EquivLoad$_{path\ i}$) as a function of received load information and received losses information of said path (Pi), and to provide thereby a set of equivalent loads ((EquivLoad$_{path\ 1}$), (EquivLoad$_{path\ 2}$); . . . ; (EquivLoad$_{path\ n}$));

second determining means coupled to said first determining means being enabled to determine a maximum equivalent load (MaxEquivLoad) out of said set of equivalent loads ((EquivLoad$_{path\ 1}$), (EquivLoad$_{path\ 2}$); . . . ; (EquivLoad$_{path\ n}$)); and third determining means enabled to determine for each said path (Pi) an increase in traffic share (TsiInc) proportional to a difference between said maximum equivalent load (MaxEquivLoad) and said equivalent load (EquivLoad$_{path\ i}$) of said path (Pi).

2. Traffic engineering means according to claim 1, wherein the third determining means (80) enabled to determine for each said path (Pi) an increase in traffic share (TsiInc) also inversely proportional to a current traffic share (Tsi) of said path (Pi).

3. Traffic engineering means according to claim 1, wherein the third determining means (80) enabled to determine for each said path (Pi) an increase in traffic share (TsiInc) is calculated according to the formula $$\text{Inc\_TS}_{path} = 0.5 * \frac{MaxEquivLoad - EquivLoad_{path}}{MaxEquivLoad + EquivLoad_{path}}$$

4. A method to generate a traffic distribution in a telecommunication network, the method comprising:

determining the traffic distribution being a traffic share for each path (Pi) of a set of paths (P1, P2, P3) between a source (S) and a destination (D1, D2) of said telecommunication network, said traffic distribution being adjusted on at least one of the following events: when a timer expires or when a load-losses information related to critically-loaded link has been received;

determining for each said path (Pi) an equivalent load (EquivLoad$_{path\ i}$) as a function of received load information and received losses information of said path (Pi) and to provide thereby a set of equivalent loads ((EquivLoad$_{path\ 1}$), (EquivLoad$_{path2}$); . . . ; (EquivLoad$_{path\ n}$));

determining a maximum equivalent load (MaxEquiLoad) out of said set of equivalent loads ((EquivLoad$_{path\ 1}$), (EquivLoad$_{path\ 2}$); . . . ; (Equiv- Load$_{path\ n}$)); and determining for each said path (Pi) an increase in traffic share (TsiInc) proportional to a difference between said maximum equivalent load (MaxEquivLoad) and said equivalent load (EquivLoad$_{path\ 1}$) of said path (Pi).

5. Method according to claim 4, where the determining for each said path (Pi) an increase in traffic share (TsiInc) is also inversely proportional to a current traffic share (Tsi of said path (Pi)).

6. Method according to claim 4, where the determining for each said path (Pi) an increase in traffic share (TsiInc) is calculated according to the formula:

$$\text{Inc\_TS}_{path} = 0.5 * \frac{MaxEquivLoad - EquivLoad_{path}}{MaxEquivLoad + EquivLoad_{path}}$$

7. A traffic engineering module of a telecommunication device in a telecommunication network for determining a traffic distribution, the traffic engineering module comprising:

first determining sub-module, which determines for each path for traffic between a source and a destination, an equivalent load as a function of received load information and received losses information of respective path, and-which provides a set of equivalent loads;

second determining sub-module, which determines a maximum equivalent load out of said set of equivalent loads; and third determining sub-module, which determines for said each path an increase in traffic share proportional to a difference between said maximum equivalent load and said equivalent load of said respective path.

8. A method to generate a traffic distribution in a telecommunication network, the method comprising:

determining the traffic distribution being a traffic share for each path of a set of paths between a source and a destination of said telecommunication network, the traffic distribution being adjusted when a timer expires or when a load-losses information related to critically-loaded link has been received;

determining for each said path an equivalent load as a function of received load information and received losses information of said path and to provide thereby a set of equivalent loads;

determining a maximum equivalent load out of said set of equivalent loads; and determining for each said path an increase in traffic share proportional to a difference between said maximum equivalent load and said equivalent load of said path.

* * * * *